(12) United States Patent
Berry et al.

(10) Patent No.: US 8,380,045 B2
(45) Date of Patent: Feb. 19, 2013

(54) SYSTEMS AND METHODS FOR ROBUST VIDEO SIGNATURE WITH AREA AUGMENTED MATCHING

(76) Inventors: Matthew G. Berry, Raleigh, NC (US); Schuyler E. Eckstrom, Beaufort, SC (US)

( * ) Notice: Subject to any disclaimer, the term of this patent is extended or adjusted under 35 U.S.C. 154(b) by 919 days.

(21) Appl. No.: 12/248,596

(22) Filed: Oct. 9, 2008

(65) Prior Publication Data

US 2009/0092375 A1    Apr. 9, 2009

Related U.S. Application Data

(60) Provisional application No. 60/978,662, filed on Oct. 9, 2007.

(51) Int. Cl.
| | |
|---|---|
| H04N 9/80 | (2006.01) |
| H04N 5/76 | (2006.01) |
| H04N 5/225 | (2006.01) |
| H04N 5/917 | (2006.01) |
| H04N 7/173 | (2006.01) |
| H04N 11/02 | (2006.01) |
| G06F 15/16 | (2006.01) |
| G06F 17/00 | (2006.01) |
| G06K 9/36 | (2006.01) |
| G06K 9/64 | (2006.01) |

(52) U.S. Cl. ..... 386/248; 386/257; 386/329; 348/207.1; 348/220.1; 348/231.1; 375/240.01; 375/240.12; 375/240.27; 382/236; 382/278; 706/45; 709/231; 715/234; 725/112; 725/113

(58) Field of Classification Search .......... 386/248, 386/257, 329, E5.003; 348/207.1, 220.1, 348/222.1, 231.1, E17.001, E17.003, E7.056; 375/240.01, 240.12, 240.27, E7.005, E7.012, 375/E7.134, E7.138, E7.162, E7.163, E7.179, 375/E7.181, E7.183, E7.211; 382/236, 278; 709/231; 715/234; 725/112, 113, 135, 31; 706/45

See application file for complete search history.

(56) References Cited

U.S. PATENT DOCUMENTS

| | | | |
|---|---|---|---|
| 5,267,351 | A | 11/1993 | Reber et al. |
| 5,537,528 | A | 7/1996 | Takahashi et al. |
| 5,630,121 | A | 5/1997 | Braden-Harder et al. |
| 5,650,941 | A | 7/1997 | Coelho et al. |
| 5,655,117 | A | 8/1997 | Goldberg et al. |
| 5,832,495 | A | 11/1998 | Gustman |
| 5,903,892 | A | 5/1999 | Hoffert et al. |
| 5,956,729 | A | 9/1999 | Goetz et al. |

(Continued)

OTHER PUBLICATIONS

Sen-Ching S. Cheung and Avideh Zakhor, Efficient Video Similarity Measurement with Video Signature, Department of Electrical Engineering and Computer Sciences, University of California, Berkeley, CA, 94720, USA, pp. 1-33.

(Continued)

*Primary Examiner* — Thai Tran
*Assistant Examiner* — Syed Hasan
(74) *Attorney, Agent, or Firm* — John L. Sotomayor

(57) ABSTRACT

Systems and methods are provided for generating unique signatures for digital video files to locate video sequences within a video file comprising calculating a frame signature for each frame of a first video; and for a second video: calculating a frame signature for each frame of the second video for corresponding first video frame signatures, calculating a frame distance between each of the corresponding video frame signatures, determining video signature similarity between the videos, and searching within a video signature similarity curve to determine a maximum corresponding to the first video within the second video. The method further applies area augmentation to the video signature similarity curve to determine a maximum from among a plurality of maxima corresponding to the first video file within the second video file.

14 Claims, 8 Drawing Sheets

U.S. PATENT DOCUMENTS

| | | | |
|---|---|---|---|
| 6,032,156 | A | 2/2000 | Marcus |
| 6,134,380 | A | 10/2000 | Kushizaki |
| 6,154,601 | A | 11/2000 | Yaegashi et al. |
| 6,172,675 | B1 | 1/2001 | Ahmad et al. |
| 6,192,183 | B1 | 2/2001 | Taniguchi et al. |
| 6,195,458 | B1 | 2/2001 | Warnick et al. |
| 6,249,280 | B1 | 6/2001 | Garmon et al. |
| 6,285,361 | B1 | 9/2001 | Brewer et al. |
| 6,292,620 | B1 | 9/2001 | Ohmori et al. |
| 6,327,420 | B1 | 12/2001 | Furukawa |
| 6,330,004 | B1 | 12/2001 | Matsuzawa et al. |
| 6,751,360 | B1 * | 6/2004 | Lu ................................. 382/278 |
| 6,895,407 | B2 | 5/2005 | Romer et al. |
| 7,272,791 | B2 * | 9/2007 | Sahuc et al. .................. 715/234 |
| 7,683,940 | B2 * | 3/2010 | Fleming ..................... 348/222.1 |
| 8,001,069 | B2 * | 8/2011 | Brooks ........................... 706/45 |
| 2002/0089646 | A1 | 7/2002 | Chang |
| 2002/0108112 | A1 | 8/2002 | Wallace et al. |
| 2004/0019524 | A1 | 1/2004 | Marshall |
| 2004/0258397 | A1 * | 12/2004 | Kim ................................. 386/94 |
| 2006/0062292 | A1 * | 3/2006 | Boice et al. .............. 375/240.01 |
| 2007/0011718 | A1 * | 1/2007 | Nee, Jr. .......................... 725/135 |
| 2008/0163288 | A1 * | 7/2008 | Ghosal et al. ................... 725/31 |

OTHER PUBLICATIONS

X. Hua, X. Chen and H. Zhang, "Robust Video Signature Based on Ordinal Measure," Microsoft Research Asia, Beijing 100080, China, pp. 1-4.

A. Bosch, X. Munoz, R. Marti, "A Review: Which is the best way to organize/classify images by content?" Image Vision Computing 2006.

A. Bosch, A Zisserman, X. Munoz, "Scene Classification Via pLSA," Computer Vision and Robotics Group, Girona.

A. Bosch, A Zisserman, X. Munoz, "Scene Classification Using a Hybrid Generative/Discriminative Approach," IEEE Transactions on Pattern Analysis and Machine Intelligence, Vol. 30, No. 4, Apr. 2008, pp. 1-37-40.

M. Boutell, J. Luo, C. Brown, "Factor-graphs for Region-base Whole-scene Classification," Proceedings of the 2006 Conf. on Computer Vision and Pattern Recognition Workshop, IEEE Computer Society, 2006.

M. Boutell, J. Luo, R.T. Gray, "Sunset Scene Classification Using Simulated Image Recomposition," Proceedings of the 2003 Int'l Conf. on Multimedia and Expo, IEEE Computer Society, 2003, pp. 37-40.

Y. Chen, J.Z. Wang, "Image Categorization by Learning and Reasoning with Regions," Journal of Machine Learning Research, 2004, vol. 5, pp. 913-939.

L. Fei-Fei, P. Perona, "A Bayesian Hierarchical Model for Learning Natural Scene Categories," Proceedings of the 2005 IEEE Computer Society Conference on Computer Vision and Pattern Recognition, IEEE Computer Society, 2005, pp. 524-531.

P. Felzenszwalb, D. Huttenlocher, "Efficient Graph-Based Image Segmentation," International Journal of Computer Vision, Sept. 2004, vol. 59, Issue 2, Kluwer Academic Publishers, pp. 167-181.

J. Fox, R. Castano, R. Anderson, "Onboard Autonomous Rock Shape Analysis for Mars Rovers," IEEE Aerospace Conference Proceedings, Paper #276, Mar. 2002.

G. Heidemann, "Unsupervised Image Categorization," Image Vision Computing 23, 2005, pp. 861-876.

D. Hoiem, A. Efros, M. Hebert, "Geometric Context from a Single Image," International Conference of Computer Vision (ICCV), IEEE, Oct. 2005, pp. 1-8.

M. Israel, E. Van Den Broek, P. Van Der Putten, "Automating the Construction of Scene Classifiers for Content-Based Video Retrieval," MDM/DKK'04, Aug. 22, 2004, Seattle, WA, USA.

J. Kivinen, E. Sudderth, M. Jordan, "Learning Multiscale Representations of Natural Scenes Using Dirichlet Processes," IEEE 11th International Conference on Computer Vision, 2007.

S. Lazebnik, C. Schmid, J. Ponce, "Beyond Bags of Features: Spatial Pyramid Matching for Recognizing Natural Scene Categories," Computer Vision and Pattern Recognition, 2006 IEEE Computer Science Society Conference, vol. 2, 2006, pp. 2169-2178.

L. Lepisto, I. Kunttu, J. Autio, A. Visa, "Comparison of Some Content-Based Image Retrieval Systems with Rock Texture Images," Proceedings of 10th Finnish Al Conference, Dec. 2002.

T. Leung, J. Malik, "Representing and Recognizing the Visual Appearance of Materials Using Three Dimensional Textons," International Journal of Computer Vision, 43, 2001, pp. 29-44.

J. Li, J. J Wang, "Automatic Linguistic Indexing of Pictures by a Statistical Modeling Approach," IEEE Transactions on Pattern Analysis and Machine Intelligence, vol. 25, No. 9, Sep. 2003.

V. Milkli, H. Kaerdi, P. Kulu, M. Besterci, "Characterization of Powder Particle Morphology," Proceedings of Estonian Acad. of Sci. Eng. vol. 7, 2001, pp. 22-34.

G. Mori, X. Ren, A. Efros, J. Malik, "Recovering Human Body Configurations: Combining Segmentation and Recognition," IEEE CS Conf. Computer Vision and Pattern Recognition, 2004.

M. Partio, B. Cramariuc, M. Gabbouj, A. Visa, "Rock Texture Retrieval Using Gray Level Co-Occurrence Matrix," 5th Nordic Signal Processing Symposium, Oct. 2002.

M. Peura, J. Iivarinen, "Efficiency of Simple Shape Descriptors," Proceedings of the Third International Workshop on Visual Form, Capri, Italy, May 1997, pp. 1-9.

P. Quelhas, J. Odobez, "Natural Scene Image Modeling Using Color and Texture Visterms," Lecture Notes in Computer Science, Springer Berlin/Heidelberg, vol. 4017, Jun. 30, 2006, pp. 411-421.

N. Serrano, A. Savakis, J.. Luo, "A Computationally Efficient Approach to Indoor/Outdoor Scene Classification," Proceedings of 16th International Conference on Pattern Recognition, 2002, vol. 4, p. 40146.

J. Shotton, M. Johnson, R. Cipolla, "Semantic Texton Forests for Image Categorization and Segmentation," IEEE Computer Vision and Pattern Recognition, 2008, pp. 1-8.

A. Torralba, A. Olivia, "Statistics of Natural Image Categories," Network: Computation in Neural Systems, Institute of Physics Publishing, 2003, vol. 14, pp. 391-412.

A. Vailaya, A. Jain, H.J. Zhang, "On Image Classification: City Images vs. Landscapes," Content-Based Access of Image and Video Libraries, 1998, Proceedings, IEEE Workshop, Jun. 21, 1998, pp. 1-23.

M. Varma, A. Zisserman, "A Statistical Approach to Texture Classification from Single Images," Kluwer Academic Publishers, 2004, Netherlands.

J. Vogel, B. Schiele, "Natural Scene Retrieval based on Semantic Modeling Step," International Conference on Image and Video Retrieval CIVR 2004, Jul. 2004, Dublin, Ireland.

B.C. Russell, A. Torralba, K. Murphy, and W. Freeman, "LabelMe: A database and web-based tool for image annotation," International Journal of Computer Vision, vol. 77, Issue 1-3, May 2008, pp. 157-173.

Z. Rasheed, M. Shah, "Scene Detection in Hollywood Movies and Tv Shows," IEEE Computer Society Conference on Computer Vision and Pattern Recognition, vol. 2, Feb. 27, 2003, pp. 1-8.

C.C. Gotlieb, H.E. Kreyszig, "Texture descriptors based on co-occurrence matrices." Computer Vision, Graphics and Image Processing, Computer Vision, Graphics and Image Processing, 51: 1990, pp. 76-80.

J. Luo, A. Savakis, "Indoor vs Outdoor Classification of Consumer Photographs Using Low-Level and Semantic Features," Image Processing, 2001 International Conference, Oct. 2001, vol. 2, 745-748.

* cited by examiner

200 ⇢

| Partitioning | | |
|---|---|---|
| P1 | P2 | P3 |
| P4 | P5 | P6 |
| P7 | P8 | P9 |

| Average Intensity | | |
|---|---|---|
| 155 | 253 | 123 |
| 54 | 32 | 128 |
| 255 | 200 | 104 |

| Ordinal Rank | | | | | | | | |
|---|---|---|---|---|---|---|---|---|
| P1 | P2 | P3 | P4 | P5 | P6 | P7 | P8 | P9 |
| 4 | 2 | 6 | 8 | 9 | 5 | 1 | 3 | 7 |

Video Signature
- Shot Signature
  - Frame Signature
  - Frame Signature
- Shot Signature
  - Frame Signature
  - Frame Signature
  - Frame Signature
- Shot Signature
  - Frame Signature
  - Frame Signature
  - Frame Signature

SYSTEMS AND METHODS FOR ROBUST VIDEO SIGNATURE WITH AREA AUGMENTED MATCHING

CROSS-REFERENCE TO RELATED APPLICATIONS

This application claims the benefit under 35 U.S.C. §119(e) of U.S. Provisional Patent Application Ser. No. 60/978,662, entitled "Robust Video Signature With Area Augmented Matching Systems and Methods," filed Oct. 9, 2007, which is incorporated herein by reference as if set forth herein in its entirety.

TECHNICAL FIELD

The present invention relates generally to digital video file signatures and uses of the same and, more particularly, to methods and systems for generating unique video signatures for digital video files wherein the video signatures are invariant with respect to changes in resolution, bit rate, and container format of the video content and, thus, comparable in whole or in part with similar video files generated with different resolution, bit rate, and container format.

BACKGROUND

The proliferation of video content publicly available on the world wide web and in other publicly available multimedia databases makes content based analysis indispensable for managing, searching, navigating, and utilizing these video resources. Determining video similarity is useful for a variety of video applications such as video copy detection, video indexing, and video searching. For example, an enormous amount of video data is available on the world wide web at sites such as YouTube, and these sites often contain duplicate content. Similarly, video databases often contain duplicate copies of video clips or segments. Removal of duplicate information could be facilitated with more accurate video comparisons.

Determining similarities within various video clips or segments is also useful for detecting copyright violations, as well as legitimate uses of video clips within larger video segments.

SUMMARY

The present invention provides systems and methods for generating unique video signatures for digital video files wherein the video signatures are invariant with respect to changes in resolution, bit rate, and container format of the video content and, thus, comparable in whole or in part with similar video files generated with different resolution, bit rate, and container format. In one embodiment, a method for generating unique signatures for digital video files for use in locating video sequences within a digital video file comprises calculating a first video frame signature for each frame of a first video file; and for a second video file: (a) setting an initial start frame to correspond to a first frame of the second video file, (b) from the initial start frame, calculating a second video frame signature for each frame of the second video file for which a corresponding first video frame signature is present, (c) calculating a frame distance between each second video frame signature and each corresponding first video frame signature, (d) determining video signature similarity between the second video file and the first video file, (e) incrementing the initial start frame to a next successive frame within the second video file; and (f) if total frame count of the first video file does not exceed a frame count from the initial start frame to a last frame of the second video file, continuing with step (b); and searching within a video signature similarity curve that includes each video signature similarity determination to determine a maximum corresponding to the first video file within the second video file. The method further applies area augmentation to the video signature similarity curve to determine a maximum from among a plurality of maxima corresponding to the first video file within the second video file.

In another embodiment, a method for generating unique signatures for digital video files for use in locating video sequences within a digital video file comprises segmenting a first video file into a plurality of video segments; and for each video segment: calculating a segment video frame signature for each frame of the video segment; for a second video file: (a) setting an initial start frame to correspond to a first frame of the second video file, (b) from the initial start frame, calculating a second video frame signature for each frame of the second video file for which a corresponding segment video frame signature is present, (c) calculating a frame distance between each second video frame signature and each corresponding segment video frame signature, (d) determining video signature similarity between the second video file and the video segment, (e) incrementing the initial start frame to a next successive frame within the second video file, and (f) if total frame count of the video segment does not exceed a frame count from the initial start frame to a last frame of the second video file, continuing with step (b), and searching within a video signature similarity curve that includes each video signature similarity determination to determine a maximum corresponding to the video segment within the second video file, and wherein the maximum identifies a located segment from within the first video file that appears within the second video file. The method further applies area augmentation to the video signature similarity curve to determine a maximum from among a plurality of maxima corresponding to the first video file within the second video file.

In another embodiment, a method for generating unique signatures for digital video files for use in locating video sequences within a digital video file comprises (i) selecting a video segment from a first video file, wherein the video segment comprises: an initial segment frame corresponding to a first frame of the first video file; and a predetermined number of frames, (ii) calculating a segment video frame signature for each frame of the video segment, (iii) for a second video file: (a) setting an initial start frame to correspond to a first frame of the second video file, (b) from the initial start frame, calculating a second video frame signature for each frame of the second video file for which a corresponding segment video frame signature is present, (c) calculating a frame distance between each second video frame signature and each corresponding segment video frame signature, (d) determining video signature similarity between the second video file and the video segment, (e) incrementing the initial start frame to a next successive frame within the second video file, and (f) if total frame count of the video segment does not exceed a frame count from the initial start frame to a last frame of the second video file, continuing with step (b), (iv) searching within a video signature similarity curve that includes each video signature similarity determination to determine a maximum corresponding to the video segment within the second video file, (v) incrementing the initial segment frame to correspond to a next successive frame within the first video file, and (vi) if the predetermined number of frames does not exceed a frame count from the initial segment frame to a last frame of the first video file, then continuing with step (ii), wherein the maximum identifies a located segment from within the first video file that appears within the second video file. The method further applies area augmentation to the video signature similarity curve to determine a maximum from among a plurality of maxima corresponding to the first video file within the second video file.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIG. 2A illustrates a single frame partitioned into 3×3 blocks.

FIG. 2B illustrates the average intensity for each partition of the blocks in FIG. 2A.

FIG. 2C illustrates the ordinal rank for each partition from FIG. 2B.

FIG. 3 illustrates the overall video signature for the multiple video shots included in a video.

DETAILED DESCRIPTION

Figure 1:
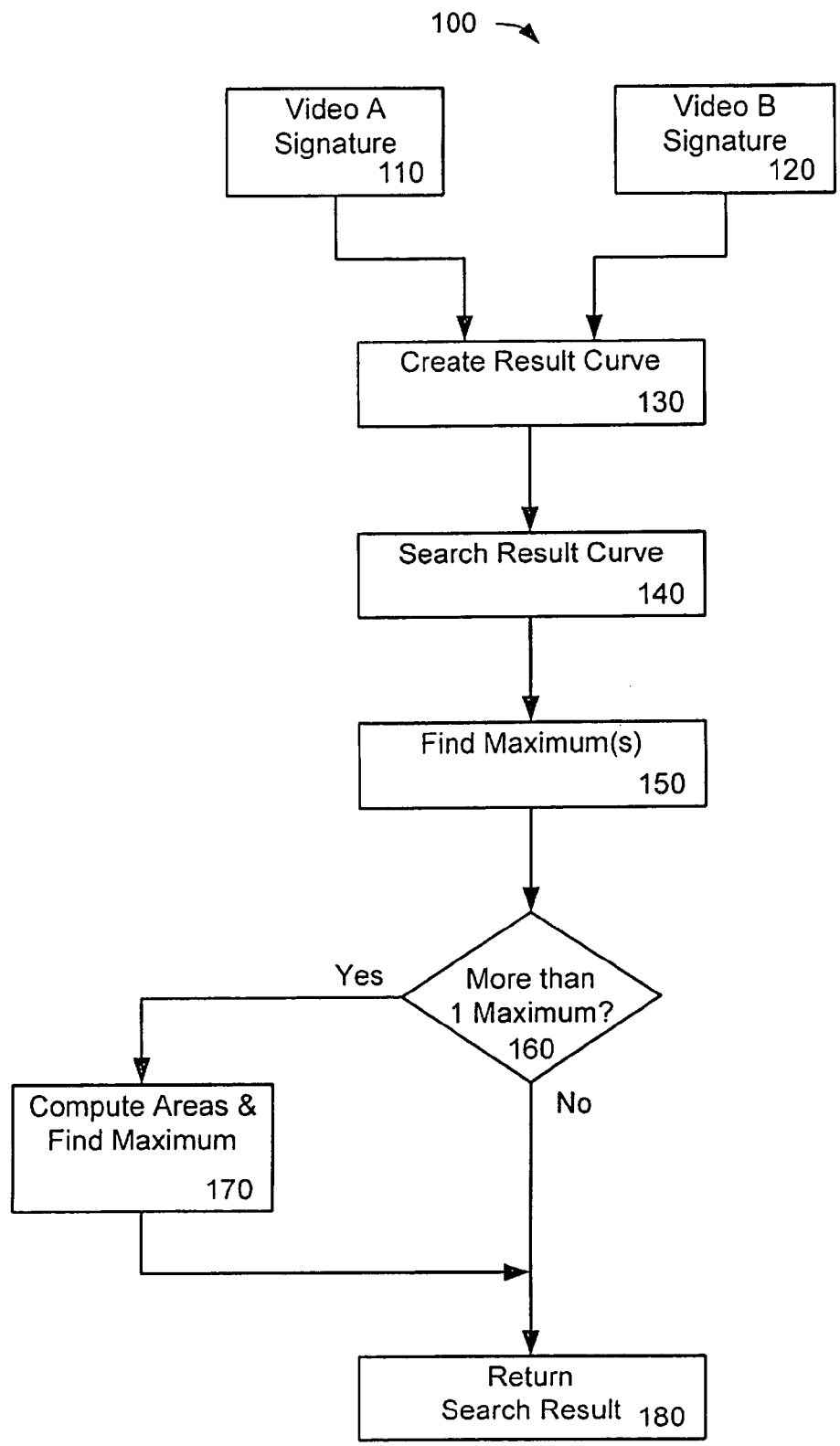
FIG. 1 is an exemplary flowchart illustrating a methodology for generating unique signatures for digital video files and using those signatures to locate video sequences within a digital video file in accordance with the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, a video program refers to any multimedia content, such as a movie, a television program, an event, a video, a video file, a video clip, an advertisement, a broadcast, or the like that a user would be interested in viewing online or in recorded format.

1.0 Introduction

The Robust Video Signature (RVS) algorithm used and incorporated into the systems and methods of the present invention allows the system to compute a descriptive signature from a video file that is invariant with respect to changes in resolution, bit rate, and container format of the video content. The resultant signature is uniquely descriptive of that single video and is searchable for sub-sequences within the signature.

2.0 Methodology

FIG. 1 is an exemplary flowchart 100 illustrating a methodology for generating unique signatures for digital video files and using those signatures to locate video sequences within a digital video file. Those of skill in the art will readily appreciate that a digital video file can include any multimedia content, such as a movie, a television program, an event, a video, a video file, a video clip, an advertisement, a broadcast, or the like that a user would be interested in viewing online or in recorded format. A video signature is generated for two video signatures 110, 120, one of which may be at least partially included within the other. The video signature is comprised of the set of individual frame signatures. The method used in computing a frame signature is described in greater detail in section 2.1 below.

Once two video signatures have been computed, the RVS algorithm can be used to advantage to create a result curve 130 indicative of a measure of video similarity between the two videos or video files. A preferred method of calculating video signature similarity is described in greater detail in section 2.5 below. The present systems and methods also enable the detection and location of a clip (or partial video) within another video where the entire video files are not identical. The result curve is searched at step 140 and at least one maximum is located at step 150. If the result curve includes more than one maximum, then area augmentation is utilized to determine the area under the curve to locate the true maximum indicative of the first video file that is at least partially contained within the second video file. The search result is provided at step 180. Such capability has numerous commercial applications that will become readily apparent to one skilled in the art.

This process is modeled after the process described by Xian-Sheung Hua, Xian Chen, and Hong-Jiang Zhang, "Robust Video Signature Based on Ordinal Measure," (ICIP 2004), October 24-27, Singapore, 2004, which is incorporated herein by reference as if set forth herein in its entirety. Further, the present systems and methods include "area based search augmentation" strategies and capabilities that improve search accuracy and reduce false positives when comparing two videos or two video signatures.

Three video search techniques are discloses as part of the present invention and can be employed for video analysis. A whole clip search is computationally expensive, and reports whether a full clip is found within a reference video. A compositional analysis provides a crude breakdown of the components that make up a video. A sliding window search is computationally expensive, but also reports both the exact location of a sub-clip within the reference video and the location within the reference video from which the sub-clip is taken. Details for each of the three search techniques are provided below after a discussion of video signatures, similarity, and area augmentation.

2.1 Frame Signature

FIG. 2 is an exemplary frame signature computation. A frame signature is computed by partitioning a single frame of a video file into $N_x$ by $N_y$ blocks (e.g., 2×3, 2×3, 3×3, 3×4, etc.). The image is then preferably converted to either an 8-bit or 16-bit HSV image. The example illustrated in FIG. 2A partitions a single frame into 3×3 blocks 200. The average intensity 210 of the value plane is then calculated for each partition in a conventional manner as shown in FIG. 2B. The resulting intensities are then sorted and the resulting ordinal measure is saved as an ordinal rank 220 for each partition as shown in FIG. 2C. The ordered set of ordinal measures is called the frame signature.

2.2 Frame Signature Distance Computation

The distance between two frame signatures is defined as the sum of the absolute values of the differences between the ordinal measures of all blocks. If we let P stand for a single frame signature, and N be the number of partitions within the signature, we can use the following equation to determine the distance between the two signatures:

$$framedist(P^x, P^y) = \sum_{i=0}^{N} |P_i^x - P_i^y|$$

2.3 Video Signature

The video signature for a given video L is the totally ordered set of frame signatures for every frame in video L. The signature for video L can only be compared against signatures from other videos with the same frame rate. Therefore, it is necessary to first resample the video to a given frame rate that is held constant across the computation of all video signatures.

2.4 Shot Boundary Signature

In some cases, two videos may share a common clip but the rest of the content in both videos differs. In this case, we can locate the common clip between the two videos by breaking the videos into shots using shot boundary detection or another similar method and then computing a video signature on each of the shots.

Each shot signature in video L is then searched against every other signature shot signature in video M using clipmatch(L,M), defined in section 2.6. In this situation, the set of shot signatures, each of which is itself a video signature, is defined as the overall video signature as shown in FIG. 3.

Figure 4:
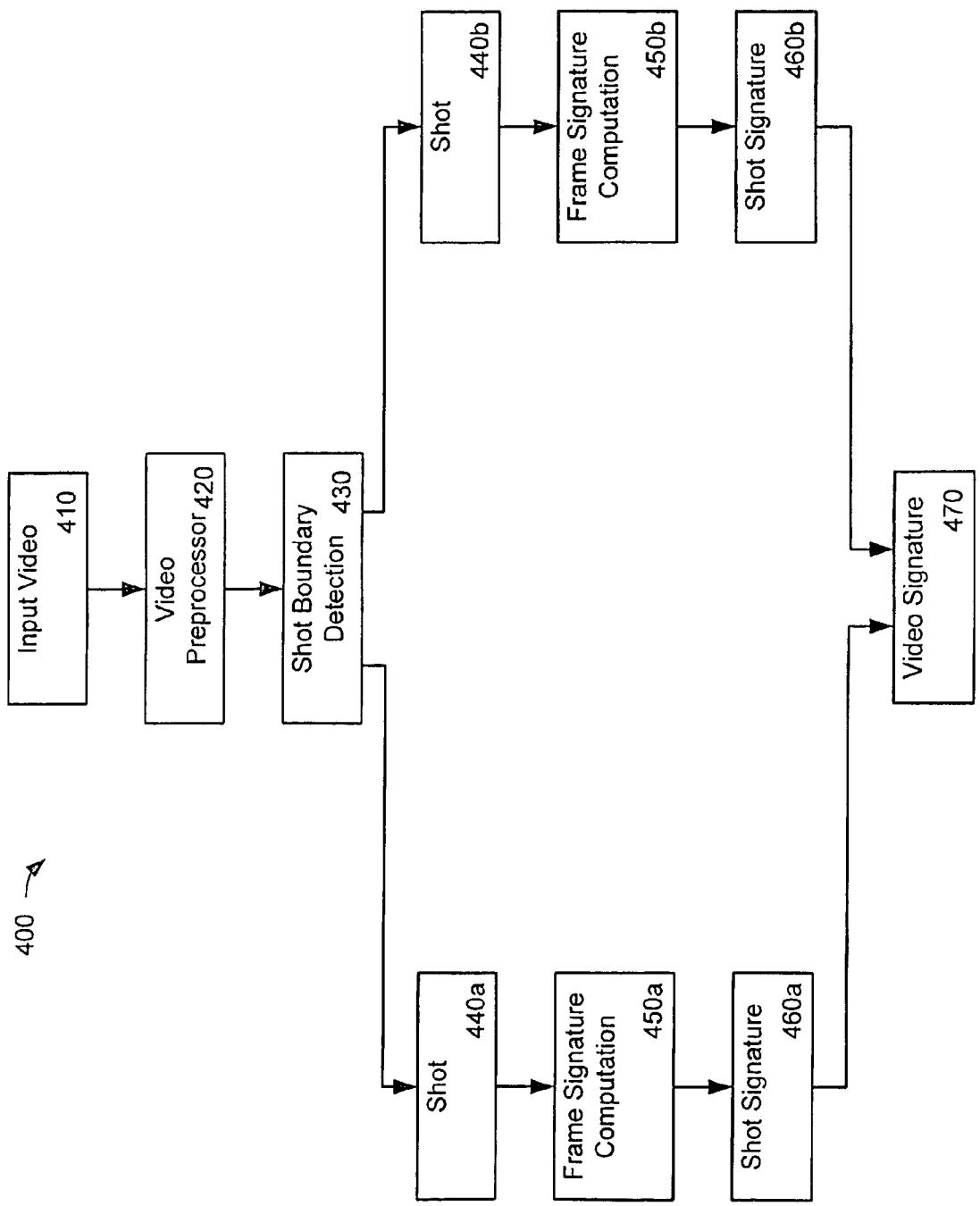
FIG. 4 is an exemplary workflow for computing a video signature.

FIG. 4 is an exemplary workflow 400 for computing a video signature. An input video 410 is received by a preprocessor 420 and shot boundary detection is applied 430. The video is broken into multiple video shots 440a, 440b. For simplicity, only two video shots are shown in this example. Frame signature computation 450a, 450b, is applied to compute the resulting shot signature 460a, 460b for each video shot. The collection of shot signatures 460a, 460b make up the video signature 470.

2.5 Video Signature Similarity

A threshold, Ψ, is defined to compute overall video signature similarity. Video signature similarity is defined as the number of frame signature distances less than or equal to the threshold divided by the total number of frame signatures compared.

Thus, for two video signatures L and M each having the same number of frame signatures within the video signatures, we can compute the video signature similarity as follows:

$$|L| = |M| \Rightarrow vidsimilarity(L, M) = \frac{\sum_{i=0}^{|L|} \Phi(framedist(L_i, M_i) \leq \Psi)}{|L|}$$

Where $\Phi(P)$ is an indicator function equal to 1 if the predicate, P, is true and zero otherwise.

In layman's terms, we count the number of frames in video L that are within the threshold to the same frame in M and divide it by the number of frames in L, giving us a percentage of frames that are within the threshold.

2.6 Video Signature Searching

If the videos L and M are not the same length, and we have reason to believe that either L or M is a clip of the other or we have reasons to try to make such determination, we can search the longer signature for an instance of the shorter clip within it. Assuming L is the longer video, we can search for the clip M using the curve described by allowing i to range from 0 to |L|−|M|+1 on a slightly modified version of the vidsimilarity (L,M)function.

$$|L| > |M| \Rightarrow vidsearch(L, M, i) = \frac{\sum_{j=i}^{|M|} \Phi(framedist(L_j, M_j) \leq \Psi)}{|M|}$$

Using the above vidsearch(L,M,i) function, we can find the starting location of clip M within L by the following function:

$$clipmatch(L, M) = \underset{i}{\arg\max}\ vidsearch(L, M, i) \in \{i \in N : i < |L| - |M| + 1\},$$

$$clipsimilarity(L, M) = vidsearch(L, M, clipmatch(L, M))$$

2.7 Area Augmentation

The above clipmatch(L,M) is well defined if and only if a single value of i gives the maximum value of vidsearch(L,M, i). If there are multiple values of i that yield the maximum, then both clipmatch(L,M) and clipsimilarity(L,M) are undefined. Thus, we must augment the clipmatch(L,M) function to enable the arg max function to select between two equal maximum peaks of the vidsearch(L,M,i) function.

Figure 5:
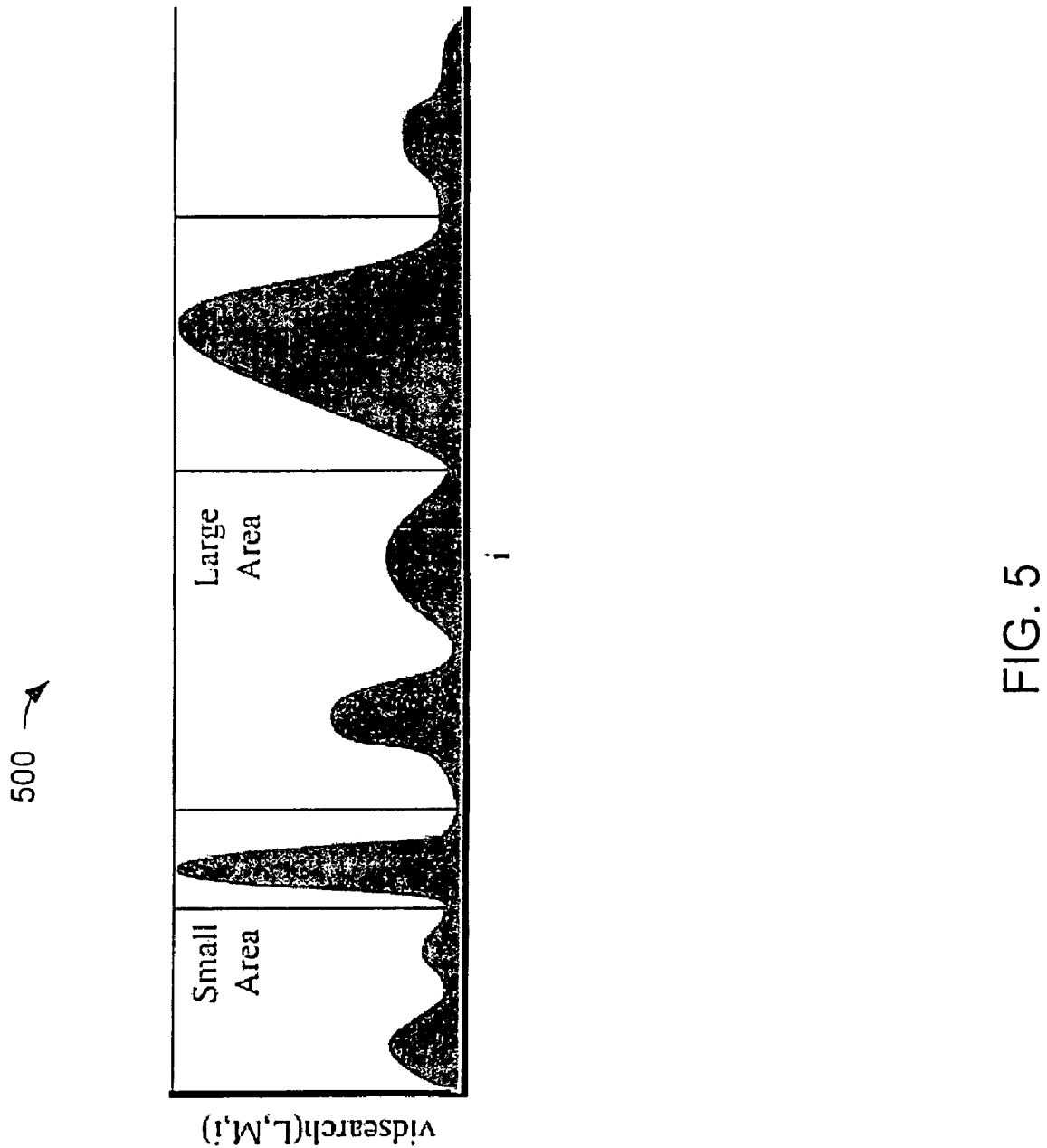
FIG. 5 is an illustrative result curve used for area augmentation.

FIG. 5 is an illustrative result curve 500 used for area augmentation. We do this by computing the area from the next least local minimum to next greatest local minimum under each peak and define the peak with the greatest area underneath it as the maximum value of vidsearch(L,M,i) (FIG. 5). The subsequence of L represented by vidsearch(L,M,i) with both the highest peak and greatest area under i is most likely to be the correct match of clip M within video L. The entire signature search workflow is illustrated in FIG. 1 above.

3.0 Whole Clip Search

Figure 6:
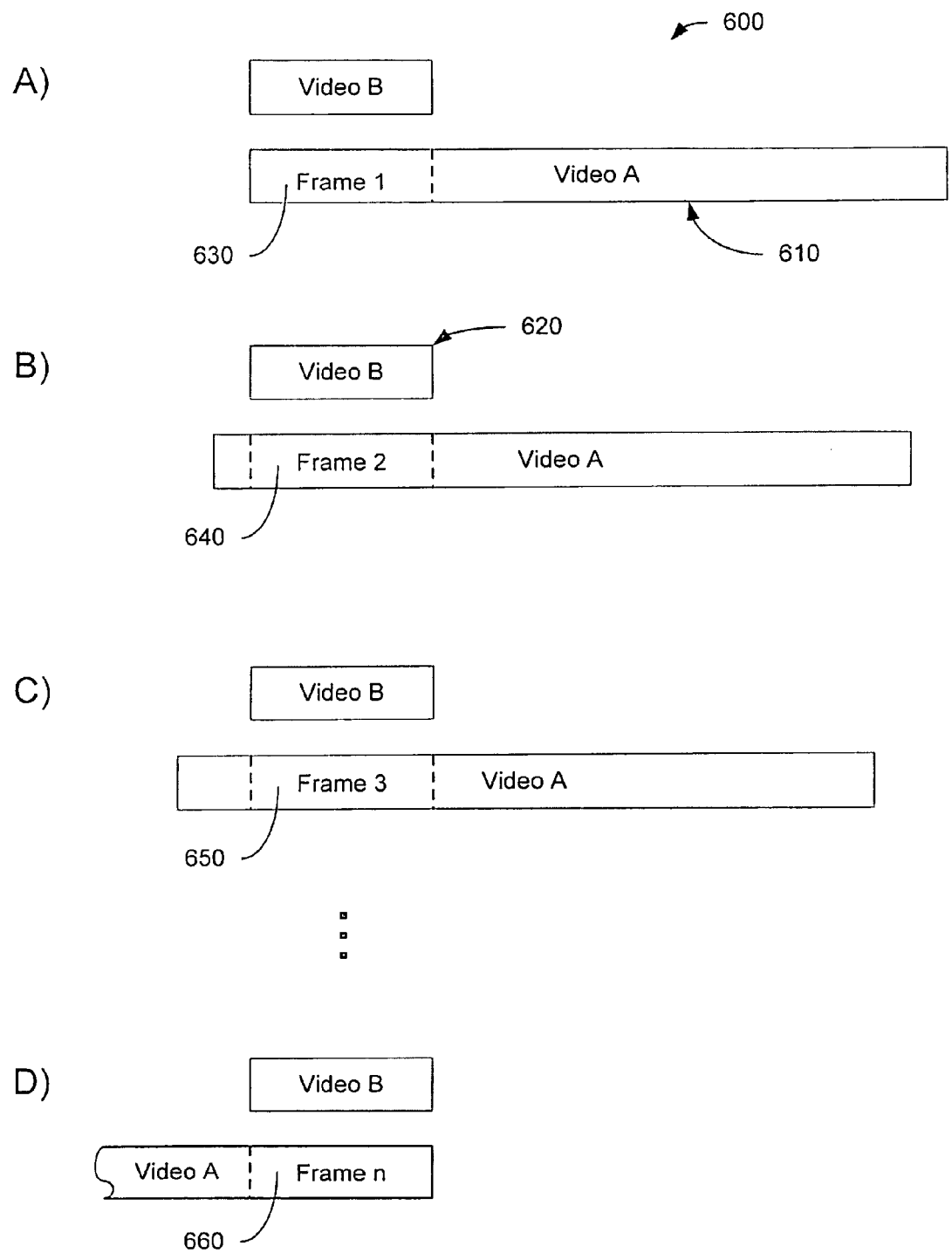
FIG. 6 is an illustration of digital videos in a whole clip search according to the present invention as in FIG. 1.

FIG. 6 is an illustration 600 of digital videos in a whole clip search according to the present invention as exemplified, for example in FIG. 1. In a whole clip search, video B 620 is an unedited portion of video A 610. Video B 620 does not contain any other content and the frames in video B 620 are present in sequential order as they appeared in video A 610 from which they were taken. Additionally, it should be noted that the content of video B 620 can even be significantly degraded. The search results do not depend on any degradation of the video copy, or any lack thereof.

To determine the location of video B 620 within video A 610, a whole clip search is performed in accordance with the RVS methodology shown in FIG. 1. The video A signature 110 is calculated from video A 610, while the video B signature 120 is calculated from video B 620. Thus, the whole of video B 620 is searched for possible locations within video A 610.

The video similarity is calculated beginning with the first frame signature 630 of video A 610 and the first frame signature of video B 620 as in FIG. 6A. The resultant similarity is noted or recorded, and the process continues with the next frame signature 640 of video A 610 as in FIG. 6B. Similarly, the process continues with the third frame signature 650 of video A 610 as in FIG. 6C, and so on until the final frame signature 660 of video A 610 as in FIG. 6D. It should be noted that the video similarity is calculated for the entirety of video B 620 as compared with corresponding frames of video A 610, and each video similarity calculation beginning with each successive frame of video A 610 until the entire length of vide A 610 is complete.

Once the video similarity calculations are complete, the methodology of FIG. 1 continues using area augmentation to select the best result for the location of video B 620 within video A 610.

4.0 Compositional Analysis Search

Figure 7:
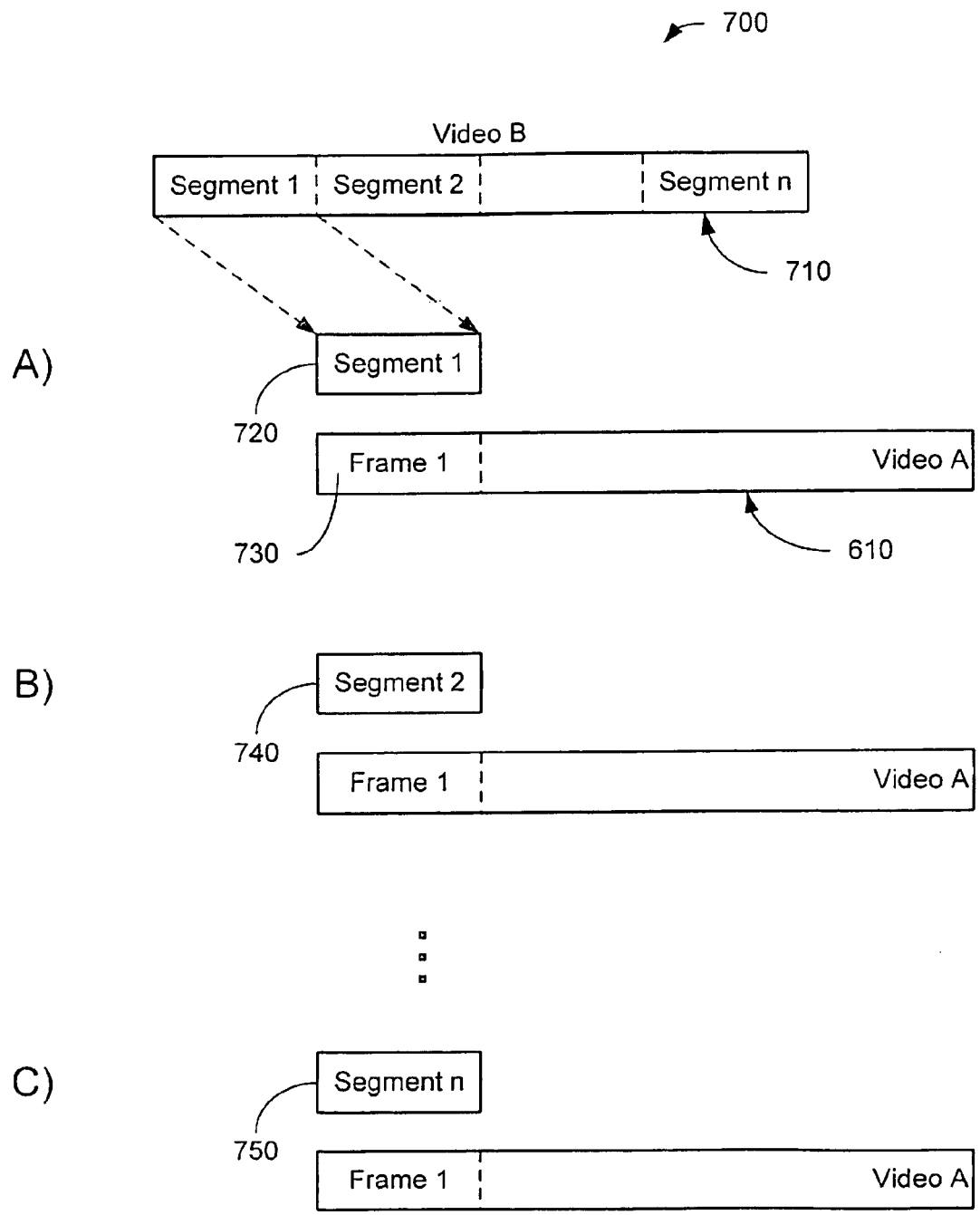
FIG. 7 is an illustration of digital videos in a compositional analysis search according to the present invention as in FIG. 1.

FIG. 7 is an illustration 700 of digital videos in a compositional analysis search according to the present invention as exemplified, for example in FIG. 1. Video B 710 contains unedited clips from one or more videos, including potentially unrelated clips. In a compositional analysis search, video B 710 is segmented into equal clips of a given length. Each resultant segment, i.e. segment1 720, segment2 740, etc., is treated as a whole clip for purposes of analysis and is run through a whole clip search against video A 610 as in FIG. 6 above.

To determine the location of a portion of video B 710 within video A 610, a whole clip search is performed for each segment of video B 710 in accordance with the RVS methodology shown in FIG. 1. The video A signature 110 is calculated from video A 610, while the video B signature 120 is calculated from the respective segment.

The video similarity is calculated beginning with the first frame signature 730 of video A 610 and the first frame signature of segment1 720 as in FIG. 7A. The resultant similarity is noted or recorded, and the process continues through the end of video A 610 as in FIG. 6 above. Once segment1 720 has progressed through video similarity calculations with video A 610, video similarity for the next segment 740 is calculated against video A as in FIG. 7B. The process continues until video similarity has been calculated for the final segment n 750 of video B 710 against video A 610.

Once a segment is identified as being within video A 610 a crude location within video A 610 is identified. Then a sliding window search can be performed to precisely locate the video B 710 portion within video A 610.

Once the video similarity calculations are complete and a segment is identified, the methodology of FIG. 1 continues using area augmentation to select the best result for the location of video B 620 within video A 610.

5.0 Sliding Window Search

Figure 8:
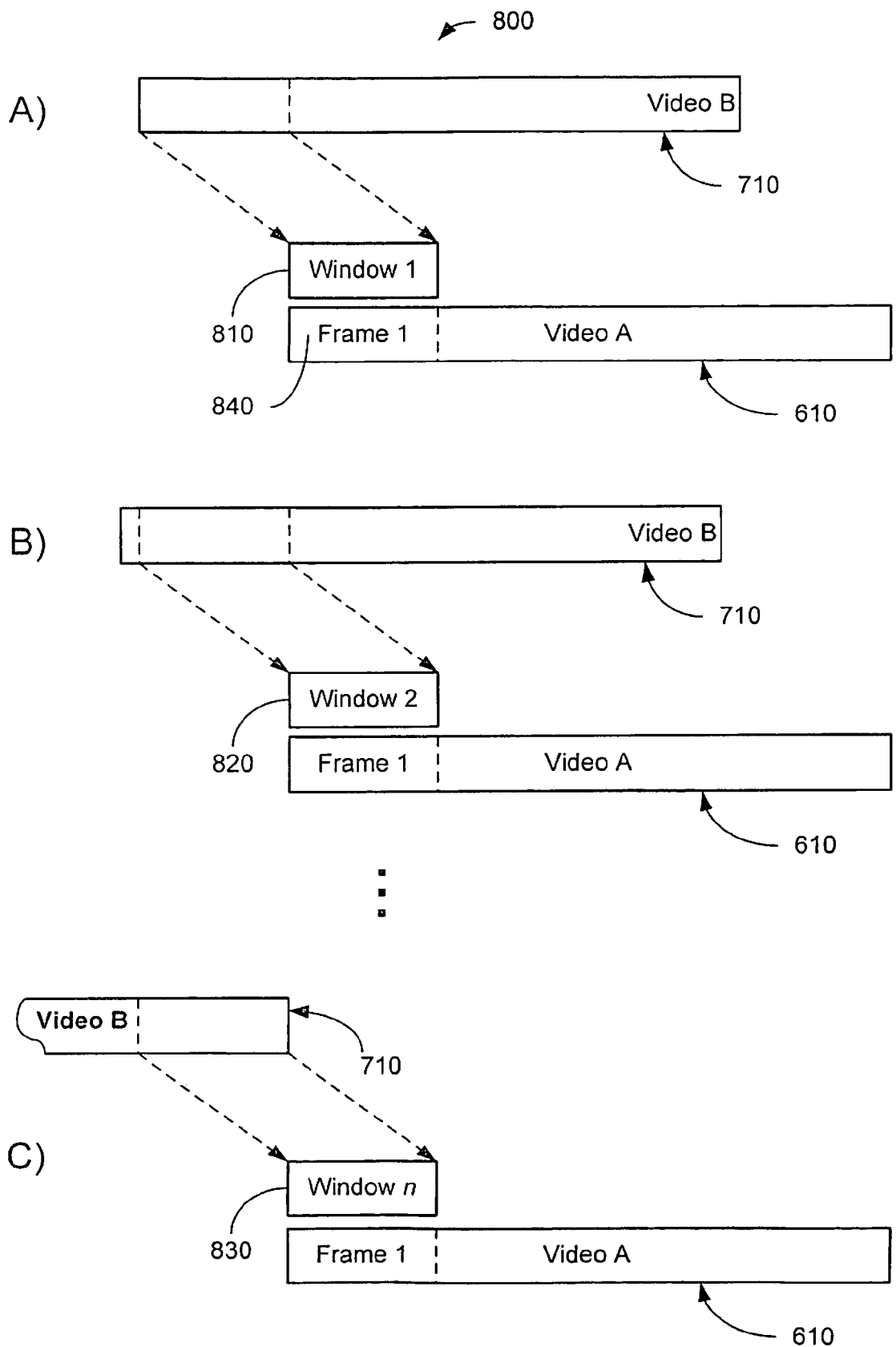
FIG. 8 is an illustration of digital videos in a sliding window search according to the present invention as in FIG. 1.

FIG. 8 is an illustration 800 of digital videos in a sliding window search according to the present invention as exemplified, for example in FIG. 1. As in the compositional analysis search, video B 710 contains unedited clips from one or more videos, including potentially unrelated clips. In a sliding window search, a window of interest, or segment, is placed at the beginning of video B 710. Each window, i.e. window1 810, window2 820, window n 830, is treated as a whole clip for purposes of analysis and is run through a whole clip search against video A 610 as in FIG. 7 above. After a window is complete, the window of interest is moved to begin with the next frame of video B 710.

To determine the location of a portion of video B 710 within video A 610, a whole clip search is performed for each window of video B 710 in accordance with the RVS methodology shown in FIG. 1. The video A signature 110 is calculated from video A 610, while the video B signature 120 is calculated from the respective window.

The video similarity is calculated beginning with the first frame signature 840 of video A 610 and the first frame signature of window1 810 as in FIG. 8A. The resultant similarity is noted or recorded, and the process continues through the end of video A 610 as in FIG. 6 above. Once the first window 810 has progressed through video similarity calculations with video A 610, video similarity for the next window 820 is calculated against video A as in FIG. 8B. The process continues until video similarity has been calculated for the final window n 830 of video B 710 against video A 610.

Once the video similarity calculations are complete and a window is identified, the methodology of FIG. 1 continues using area augmentation to select the best result for the location of video B 620 within video A 610.

It should be noted that the sliding window merely moves the window to the next frame of video B 710. The process thus searches for the window through the entirety of video A 610. While being more processor intensive, the methodology provides a very precise location of the video clip within the searched video.

It should also be noted that a 10 second window provides results with accuracy above 99%. Accuracies approach this result for longer windows up to approximately 30 seconds. For longer times the accuracy remains above 90%.

6.0 Results

In real-world applications, once a video has been preprocessed to a given frame rate, the present system, using the RVS algorithm, is able to compute its signature very quickly. The resultant signature can be used in comparisons, taking only milliseconds to search through long videos.

The resulting video signature is robust. A video will still match its baseline signature with high confidence scores (e.g., above 90%) even after sustaining a 75% reduction in resolution and bit rate. The present system is also able successfully to match clips as short as five seconds. When searching for a clip, area augmentation serves to reduce greatly the probability of a false positive being selected as a match if it occurs earlier in the video than the true positive match.

Because the present system runs very efficiently, and its resultant signatures are very compact at around 8 KB per 30 minutes of video, it scales well and is suitable both for the searching of large databases of long videos for short clips and for single video comparisons.

In testing, we have found that a sampling rate of 5 FPS yielded the highest accuracy when searching for a clip. Higher sampling frequencies did not improve accuracy, since a real world video is unlikely to significantly change in a shorter time span than 5 Hz. We also found that when computing the frame signature, a 2 by 3 partitioning scheme gave us the best balance of feature granularity and noise tolerance. Thresholding the vidsearch(L,M,i) curve at 0.5 also slightly improved the area augmentation.

With these settings, using a small body of sample videos, searching for random 10, 30, and 60 second clips returned the correct result 100% of the time. Searching for 5 second clips averaged around 90% accuracy. All confidence scores for these search matches were between 90-100%.

7.0 Applications

This system is capable of being employed to search for copyrighted clips in a database of user-generated content, even if the content in the database has suffered a large reduction in bit rate and resolution and the copyrighted clips are very short.

The system is also usable to determine if two videos are the same content, if, for example, the file name, format, bit rate, resolution, etc., of one of the videos changes. This can be used prevent redundancy in a video database.

In view of the foregoing detailed description of preferred embodiments of the present invention, it readily will be understood by those skilled in the art that the present invention is susceptible to broad utility and application. While various aspects have been described in the context of algorithms and uses of the same within systems and methods, additional aspects, features, and methodologies of the present invention will be readily discernable therefrom. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. A method for generating unique signatures for digital video files for use in locating video sequences within a digital video file, the method comprising the steps of:
    receiving video files at a video preprocessor;
    calculating a first video frame signature in the video preprocessor for each frame of a first video file;
    for a second video file:
        (a) setting an initial start frame to correspond to a first frame of the second video file;
        (b) from the initial start frame, calculating a second video frame signature for each frame of the second video file for which a corresponding first video frame signature is present;
        (c) calculating a frame distance between each second video frame signature and each corresponding first video frame signature;
        (d) determining video signature similarity between the second video file and the first video file;
        (e) incrementing the initial start frame to a next successive frame within the second video file; and
        (f) if total frame count of the first video file does not exceed a frame count from the initial start frame to a last frame of the second video file, continuing with step (b); and
    searching within a video signature similarity curve that includes each video signature similarity determination to determine one or more maximum video signature peak similarities;
    computing the area from the next least local minimum to the next greatest local minimum under each maximum video signature peak similarity as the video signature similarity curve area for each maximum video signature peak similarity; and
    selecting the maximum video signature peak similarity associated with the largest video signature similarity curve area as corresponding to the first video file within the second video file.

2. The method of claim 1, wherein the video signature similarity corresponds to the initial start frame and is a percentage of second frame signatures within a predetermined threshold of corresponding first frame signatures.

3. The method of claim 1, further comprising re-sampling the first video and the second video to establish a constant frame rate.

4. The method of claim 3, wherein the constant frame rate is 5 frames per second.

5. A method for generating unique signatures for digital video files for use in locating video sequences within a digital video file, the method comprising the steps of:
    segmenting a first video file into a plurality of video segments in a video preprocessor;
    for each video segment:
        calculating a segment video frame signature for each frame of the video segment;
    for a second video file:
        (a) setting an initial start frame to correspond to a first frame of the second video file;
        (b) from the initial start frame, calculating a second video frame signature for each frame of the second video file for which a corresponding segment video frame signature is present;

(c) calculating a frame distance between each second video frame signature and each corresponding segment video frame signature;

(d) determining video signature similarity between the second video file and the video segment;

(e) incrementing the initial start frame to a next successive frame within the second video file; and (f) if total frame count of the video segment does not exceed a frame count from the initial start frame to a last frame of the second video file, continuing with step (b); and searching within a video signature similarity curve that includes each video signature similarity determination to determine one or more maximum video signature peak similarities; and computing the area from the next least local minimum to the next greatest local minimum under each maximum video signature peak similarity as the video signature similarity curve area for each maximum video signature peak similarity; and selecting the maximum video signature peak similarity associated with the largest video signature similarity curve area as identifying a located segment from within the first video file that appears within the second video file.

6. The method of claim 5, wherein the video signature similarity corresponds to the initial start frame and is a percentage of segment frame signatures within a predetermined threshold of corresponding first frame signatures.

7. The method of claim 5, further comprising re-sampling the first video and the second video to establish a constant frame rate.

8. The method of claim 7, wherein the constant frame rate is 5 frames per second.

9. A method for generating unique signatures for digital video files for use in locating video sequences within a digital video file, the method comprising the steps of:

(i) selecting a video segment from a first video file within a video preprocessor, wherein the video segment comprises:

an initial segment frame corresponding to a first frame of the first video file; and a predetermined number of frames;

(ii) calculating a segment video frame signature for each frame of the video segment;

(iii) for a second video file:

(a) setting an initial start frame to correspond to a first frame of the second video file;

(b) from the initial start frame, calculating a second video frame signature for each frame of the second video file for which a corresponding segment video frame signature is present;

(c) calculating a frame distance between each second video frame signature and each corresponding segment video frame signature;

(d) determining video signature similarity between the second video file and the video segment;

(e) incrementing the initial start frame to a next successive frame within the second video file; and (f) if total frame count of the video segment does not exceed a frame count from the initial start frame to a last frame of the second video file, continuing with step (b);

(iv) searching within a video signature similarity curve that includes each video signature similarity determination to determine one or more maximum video signature peak similarities; and computing the area from the next least local minimum to the next greatest local minimum under each maximum video signature peak similarity as the video signature similarity curve area for each maximum video signature peak similarity; and selecting the maximum video signature peak similarity associated with the largest video signature similarity curve area as corresponding to the first video file within the second video file;

(v) incrementing the initial segment frame to correspond to a next successive frame within the first video file; and (vi) if the predetermined number of frames does not exceed a frame count from the initial segment frame to a last frame of the first video file, then continuing with step (ii), wherein the maximum similarity and associated maximum curve area identifies a located segment from within the first video file that appears within the second video file.

10. The method of claim 9, wherein the video signature similarity corresponds to the initial start frame and is a percentage of second frame signatures within a predetermined threshold of corresponding first frame signatures.

11. The method of claim 9, further comprising re-sampling the first video and the second video to establish a constant frame rate.

12. The method of claim 11, wherein the constant frame rate is 5 frames per second.

13. The method of claim 9, wherein the video segment has a length of 10 seconds.

14. The method of claim 9, wherein the video segment has a length between 10 seconds and 30 seconds.

* * * * *